(12) United States Patent
Kong

(10) Patent No.: US 7,206,312 B2
(45) Date of Patent: Apr. 17, 2007

(54) NETWORK ADDRESS CONVERSION SYSTEM FOR ENABLING ACCESS TO A NODE HAVING A PRIVATE IP ADDRESS, A METHOD THEREFOR, AND A RECORDING MEDIUM FOR RECORDING THE METHOD

(75) Inventor: Won-Keun Kong, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 798 days.

(21) Appl. No.: 09/938,507

(22) Filed: Aug. 27, 2001

(65) Prior Publication Data

US 2002/0024959 A1 Feb. 28, 2002

(30) Foreign Application Priority Data

Aug. 26, 2000 (KR) ................ 2000-49934

(51) Int. Cl.
*H04L 12/28* (2006.01)
(52) U.S. Cl. ............ 370/401; 370/230; 370/392; 370/466
(58) Field of Classification Search ............. 370/230, 370/231, 392, 401, 466, 475, 245
See application file for complete search history.

(56) References Cited

U.S. PATENT DOCUMENTS

| 6,058,431 | A | * | 5/2000 | Srisuresh et al. | 709/245 |
|---|---|---|---|---|---|
| 6,128,298 | A | * | 10/2000 | Wootton et al. | 370/392 |
| 6,128,664 | A | * | 10/2000 | Yanagidate et al. | 709/228 |
| 6,760,780 | B1 | * | 7/2004 | Chitturi et al. | 709/248 |
| 6,829,239 | B1 | * | 12/2004 | Bhatia et al. | 370/392 |
| 6,879,593 | B1 | * | 4/2005 | Kunze et al. | 370/401 |
| 6,944,167 | B1 | * | 9/2005 | McPherson | 370/401 |

FOREIGN PATENT DOCUMENTS

KR 10-2000-0000185 A 1/2000

OTHER PUBLICATIONS

Korean Office Action dated Sep. 28, 2006 issued in Korean Patent Application No. 2000-49934.

* cited by examiner

*Primary Examiner*—Wing Chan
*Assistant Examiner*—Nguyen H. Ngo
(74) *Attorney, Agent, or Firm*—Sughrue Mion, PLLC

(57) ABSTRACT

A network address conversion system for enabling access to a specific node of a private network, having a private IP address, a method therefor, and a recording medium for recording the method. The network address conversion system includes a reservation unit for receiving an access reservation demand from an external network node to access a specific node of the private network, an external port value allocation unit for allocating the external port value to the specific node, and transmitting the external port value to the external network node, a mapping table for storing the external port value, and an address conversion unit for converting the external port value into a private IP address of the specific node, when the external network node accesses the specific node by using the external port value. As a result, the external network node of the Internet can access the specific node of the private network, having the private IP address.

10 Claims, 6 Drawing Sheets

PRIOR ART

PRIOR ART

NETWORK ADDRESS CONVERSION SYSTEM FOR ENABLING ACCESS TO A NODE HAVING A PRIVATE IP ADDRESS, A METHOD THEREFOR, AND A RECORDING MEDIUM FOR RECORDING THE METHOD

BACKGROUND OF THE INVENTION

1. Field of the Invention

The present invention relates to a network address conversion system, and in particular to a network address conversion system for enabling access to a node having a private IP address, a method therefor, and a recording medium for recording the method. The present application is based on Korean Patent Application No. 2000-49934, which is incorporated herein by reference.

2. Description of the Related Art

Recently, a number of information communication devices such as computers, faxes, modems, and telephones can be used in a network in a single office.

The networks provided in small office home offices (SOHO) and homes are mostly private networks, in which a gateway has a global IP address, while the other information communication devices do not have global IP addresses.

Accordingly, the respective information communication devices (that is, network nodes) of the private network have private IP addresses which can only be used for internal purpose.

The private IP address is provided by a network administrator or automatically provided through a communication protocol, such as Dynamic Host Configuration Protocol (DHCP).

In addition, the network nodes have port numbers. At this time, the port number implies a communication protocol in the network node.

However, it is expected that the network nodes of the private network having the private IP addresses will have to provide services to external network nodes on the Internet.

For this, the external Internet must be able to access the network nodes of the private network.

Currently, the gateway (network entrypoint) of the private network converts the private IP address of the private network into a public IP address, and thus the network node using the private IP address of the private network can access a node of the Internet to use services.

As an exemplary address conversion method, there is a network address port translation (NAPT). In the NAPT, when the network node of the private network intends to access the external node, a node corresponding to a network entrypoint allocates an external port value, thereby externally transmitting a packet.

A conventional network address conversion system on the Internet will now be explained with reference to the accompanying drawings.

FIG. 1 is a structure diagram illustrating a general network system on the Internet.

As illustrated in FIG. 1, a private network 20 is a SOHO or home network which connects a plurality of information communication devices.

The private network 20 includes one gateway node 21 and a plurality of network nodes 20a, 20b, . . . , 20n. The gateway node 21 is a modem, router, gateway or switch which has a public IP address. The private network 20 is connected to the Internet 10 through the gateway node 21.

In addition, the plurality of network nodes 20a, 20b, . . . , 20n are information communication devices connected through the network, such as desktop computers, notebook computers, printers, and faxes.

The network nodes 20a, 20b, . . . , 20n have private IP addresses internally used in the private network 20.

Here, the public IP address of the private network 20 is SIP, and the private IP addresses and port numbers of the nodes 20a–20n are respectively (LIP1, LPN1), (LIP2, LPN2), . . . , and (LIPn, LPNn).

A few private networks such as an office network 30 and a home network 40 are connected to the Internet.

A network node 12 has a public IP address and provides a service on the Internet. The public IP address and port number of the network node 12 are DIP and PD.

The private network nodes of the office network 30 and the home network 40 can access the network node 12 in order to receive the Internet service from the network node 12.

A conventional network address conversion method when the node 20a accesses the network node 12 will now be described.

FIG. 2 is a flowchart showing sequential steps of the conventional network address conversion method, and FIG. 3 shows a signal flow in a state where the network node of the private network accesses an external network node of the Internet.

In FIG. 3, D denotes an address and port number of a destination, and S denotes an address and port number of a source.

First, the node 20a of the private network 20 transmits a packet to the network node 12 to use services (step S202). The packet includes the address and port information (LIP1, LPN1) of the source and the address and port information (DIP, PD) of the destination.

The gateway node 21 having the public IP address receives the packet (step S204), allocates a new port number Px to the private IP address and port number (LIP1, LPN1) of the source node 20a (step S206), and records a mapping relation in a conversion table (step S208).

Thereafter, the gateway node 21 converts the source information of the received packet, by using the public IP address SIP and the newly-allocated port number Px (step S210).

(LIP1, LPN1)→(SIP, Px)

The gateway node 21 transmits the converted packet through the Internet. According to the source information, the packet is transmitted to the network node 12 (step S212).

The network node 12 performs an operation according to the contents of the packet, generates a response packet, and transmits the response packet through the Internet (step S214).

Here, the source information and the destination information are exchanged, and thus the destination information becomes (SIP, Px).

According to the destination information, the response packet is transmitted to the gateway node 21 of the private network 20 which has the public IP address of SIP.

The gateway node 21 receiving the response packet converts the port number Px of the destination information into a value stored in the conversion table (step S216).

(Px)→(LIP1, LPN1)

Therefore, the response packet is transmitted to the node 20a having the address and port number of (LIP1, LPN1), namely the node transmitting the packet requesting use of the services (step S218).

On the other hand, the gateway node 21 deletes the value stored in the conversion table (step S220).

As described above, in the conventional network address conversion system on the Internet, the node of the private network can transmit data to the external node of the Internet.

However, the private IP address cannot be used on the Internet. As a result, the Internet node cannot demand a service from the node of the private network.

SUMMARY OF THE INVENTION

Accordingly, an object of the present invention is to provide a network address conversion system for enabling access to a network node of a private network having a private IP address, a method therefor, and a recording medium for recording the method.

In order to achieve the above-described object of the present invention, there is provided a network address conversion system for enabling access to a node of a private network having a private IP address, including a reservation unit for receiving an access reservation demand from an external network node to access a specific node of the private network; an external port value allocation unit for allocating the external port value to the specific node, and transmitting the external port value to the external network node; a mapping table for storing the external port value; and an address conversion unit for converting the external port value into a private IP address of the specific node, when the external network node accesses the specific node by using the external port value.

In addition, there is provided a network address conversion method for enabling access to a node of a private network having a private IP address, including the steps of receiving an access reservation demand from an external network node to access a specific node of the private network; allocating the external port value to the specific node, storing the external port value in a mapping table, and transmitting the external port value to the external network node; and converting the external port value into a private IP address of the specific node, when the external network node accesses the specific node by using the external port value.

The above object of the present invention is also accomplished by a recording medium for recording a network address conversion method for enabling access to a node of a private network having a private IP address, the recording medium recording a program for executing on a computer, the steps of receiving an access reservation from an external network node to access a specific node of the private network; allocating the external port value to the specific node, storing the external port value in a mapping table, and transmitting the external port value to the external network node; and converting the external port value into a private IP address of the specific node, when the external network node accesses the specific node by using the external port value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A network address conversion system for enabling access to a node having a private IP address, a method therefor, and a recording medium for recording the method in accordance with the preferred embodiments of the present invention will now be described in greater detail with reference to the accompanying drawings.

Figure 1:
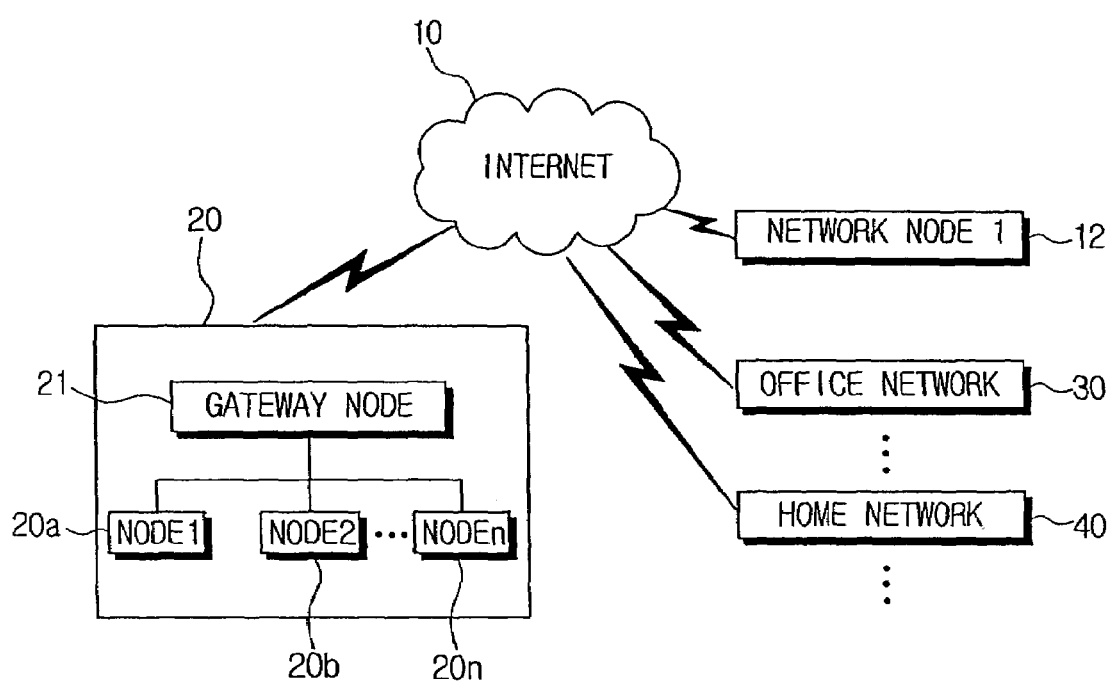
FIG. 1 is a structure diagram illustrating a general network system on the Internet.
Figure 2:
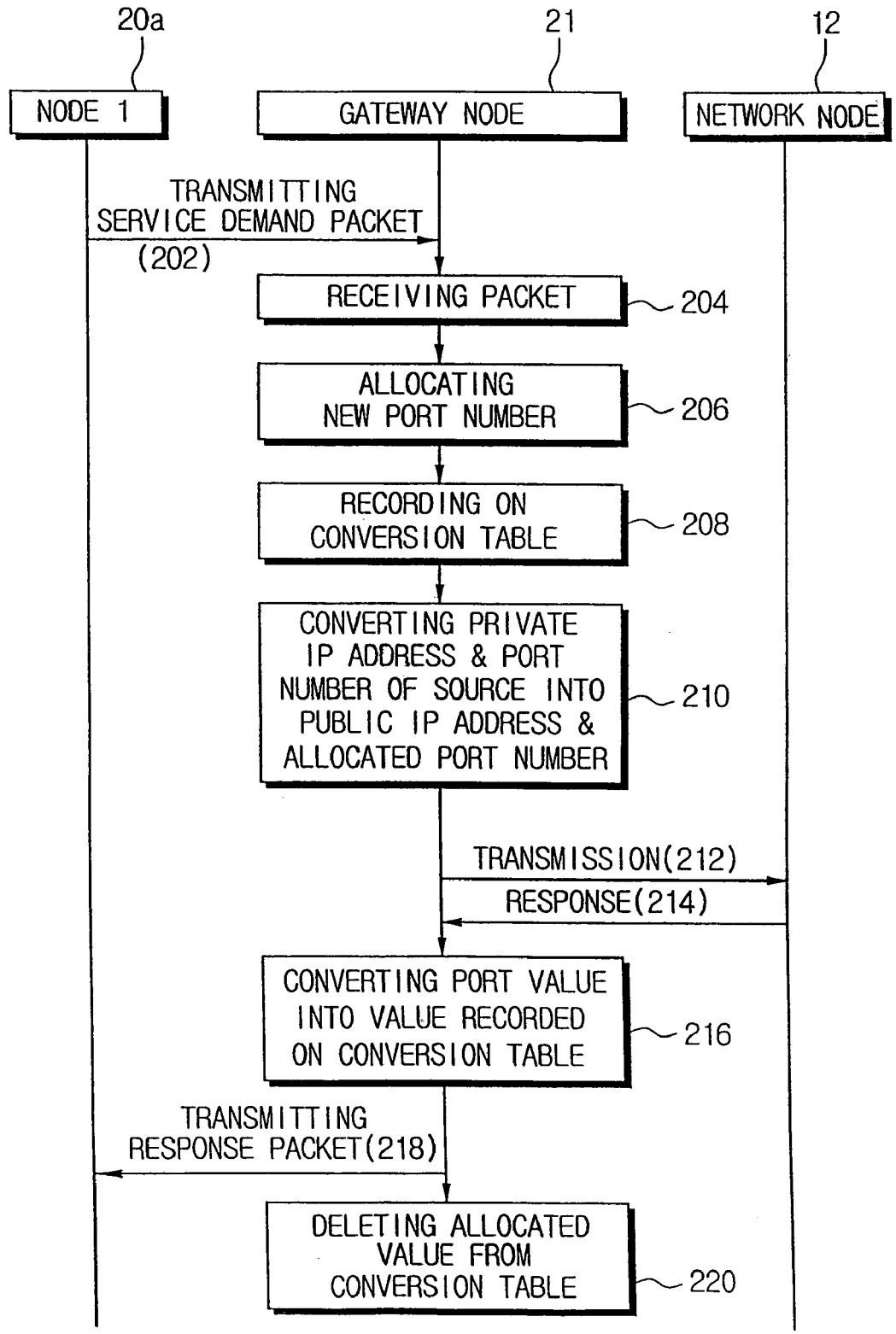
FIG. 2 is a flowchart showing sequential steps of a conventional network address conversion method.
Figure 3:
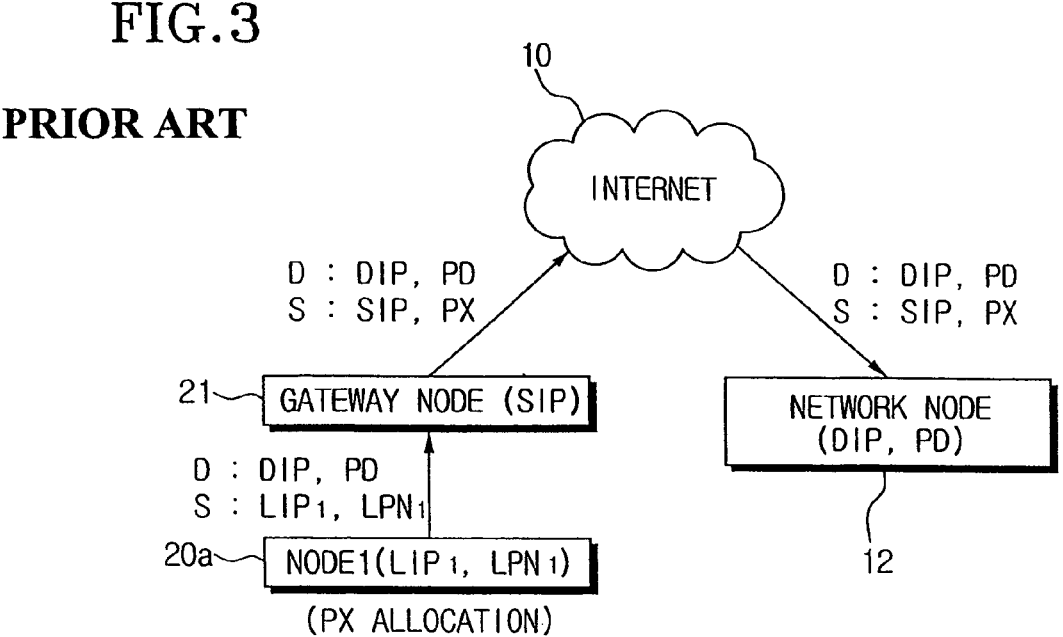
FIG. 3 shows a signal flow in a state where a node of a private network accesses an external network node of the Internet.

In the general network system on the Internet shown in FIG. 1, the external network node 12 of the Internet is able to access the specific node (for example, node 20*a*) of the private network through the network address conversion system.

Figure 4:
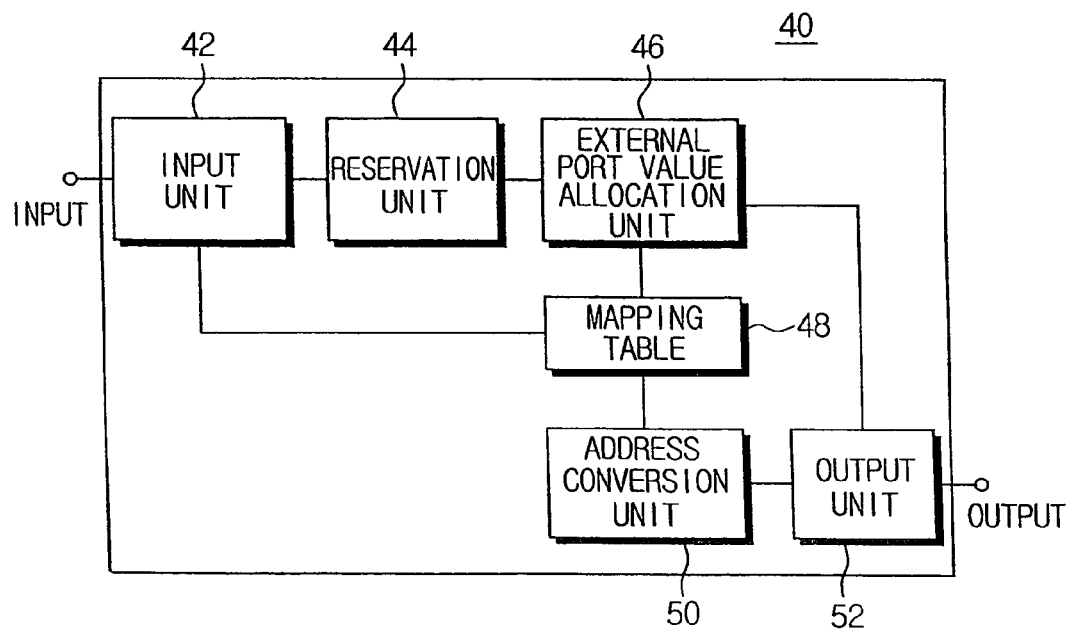
FIG. 4 is a block diagram illustrating a network address conversion system in accordance with the present invention.

FIG. 4 is a block diagram illustrating the network address conversion system in accordance with the present invention.

Referring to FIG. 4, the network address conversion system 40 includes an input unit 42, a reservation unit 44, an external port value allocation unit 46, a mapping table 48, an address conversion unit 50, and an output unit 52.

The reservation unit 44 receives an access reservation demand or reservation cancel demand from the external network node with regard to the specific node of the private network which does not have a public IP address, but a private IP address.

When receiving the access reservation demand, the reservation unit 44 demands the external port value allocation unit 46 to allocate an external port value of the reserved node.

Then, the external port value allocation unit 46 allocates the external port value to access the reserved node of the private network, and stores the external port value in the mapping table 48.

When the external network node accesses the reserved node of the private network by using the external port value, the address conversion unit 50 converts the external port value into the private IP address of the reserved node.

The network address conversion method, which is implemented while the external network node accesses the specific node of the private network which has a private IP address, will now be explained.

Figure 5:
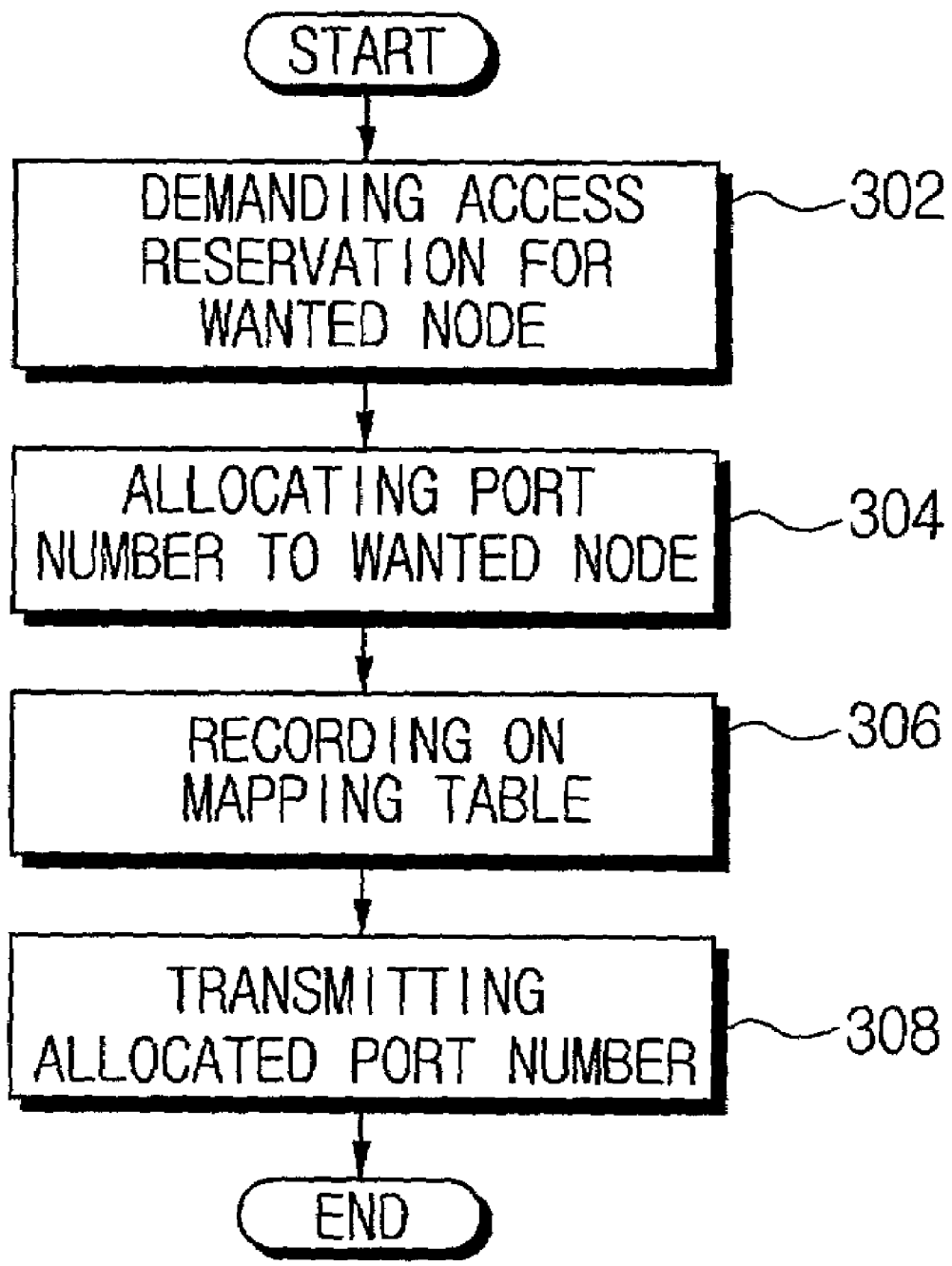
FIG. 5 is a flowchart of the process in which an external network node of the Internet makes a reservation to access a specific node of the private network.

FIG. 5 is a flowchart of the process in which the external network node makes a reservation for access to the specific node of the private network.

First, the network node 12 accesses the gateway node 21 of the private network 20 by using the public IP address of the private network 20, and demands an access reservation for an access wanted node (step S302).

Here, the access wanted node to which the network node 12 intends to access is the node 1 20a, and the private IP address and port number of the node 1 20a are (LIP1, LPN1).

The gateway node 21 allocates a new port number Px to the private IP address and port number (LIP1, LPN) of the node 20a (step S304), and stores the port number in the mapping table (step S306).

(LIP1, LPN1)→(Px)

Thereafter, the gateway node 21 transmits the information of the allocated port number to the network node 12 which has demanded the reservation (step S308).

Figure 6:
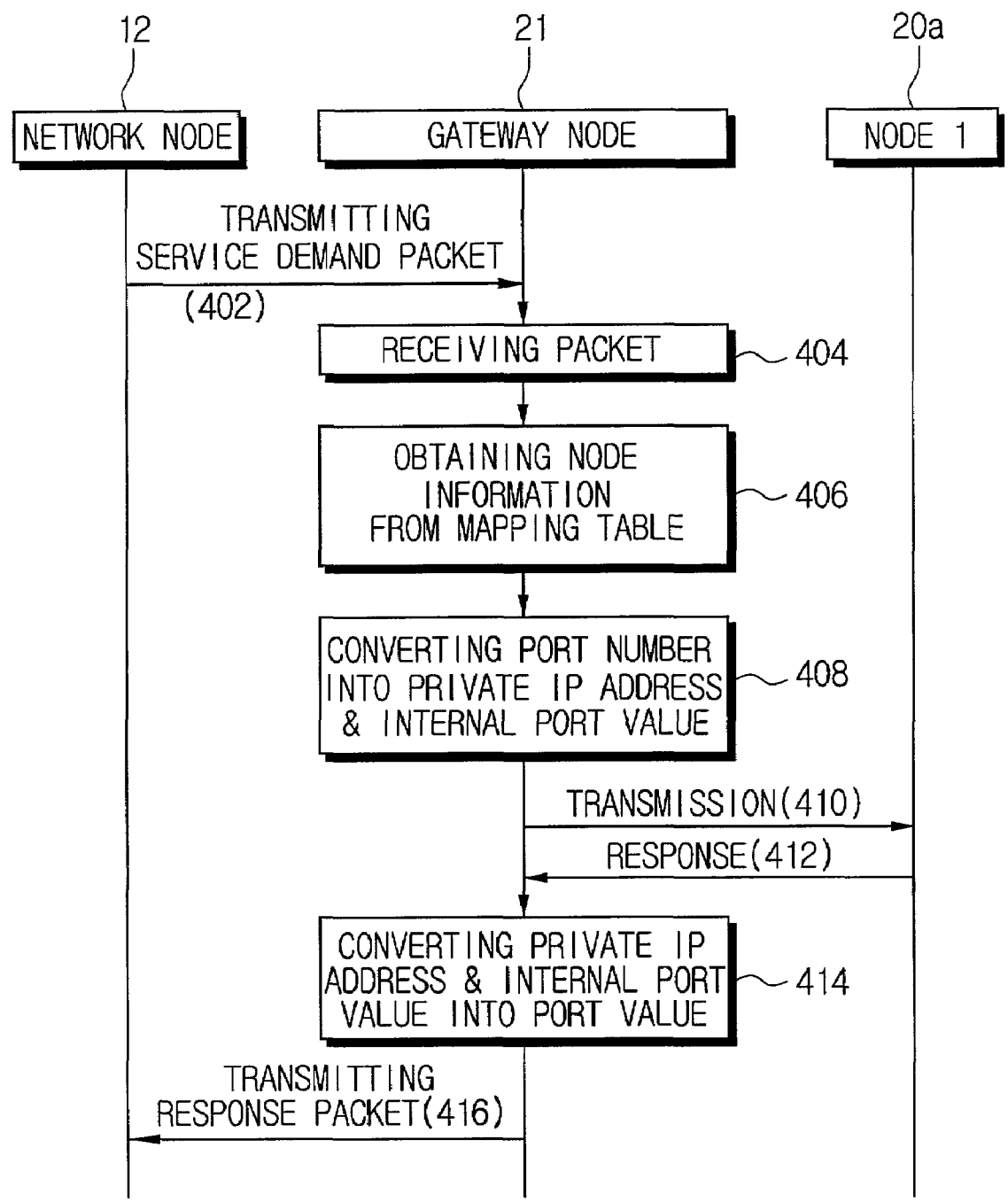
FIG. 6 is a flowchart of the process in which the external network node accesses the reserved node of the private network.
Figure 7:
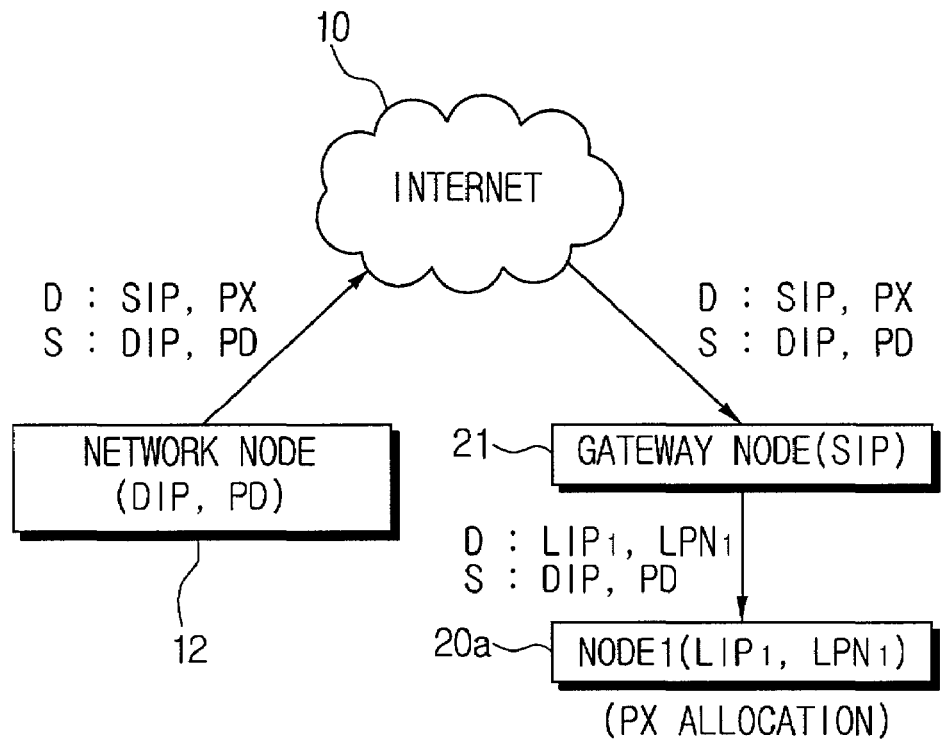
FIG. 7 shows a signal flow during the process of FIG. 6.

FIG. 6 is a flowchart of the process in which the external network node accesses the reserved node of the private network, and FIG. 7 shows a signal flow during the process of FIG. 6.

In the drawings, a reference character 'D' denotes an address and port number of a destination, and 'S' denotes an address and port number of a source.

The network node 12, which demanded an access reservation through the process of FIG. 5, is informed of the port number allocated to the node 20a of the private network 20.

The network node 12 transmits a service demand packet to the node 20a of the private network 20 through the Internet, by using the allocated port number (step S402).

The destination information of the service demand packet includes the public IP address SIP of the gateway of the private network 20 and the allocated port number Px.

The gateway node 21 having the public IP address SIP receives the service demand packet (step S404).

Thereafter, the gateway node 21 obtains necessary information from the mapping table in order to access the destination node of the private network (step S406).

That is, the gateway node 21 converts the port number Px of the received packet into the corresponding private IP address and port number (LIP1, LPN1) on the basis of the mapping table (step S408).

(SIP, Px)→(LIP1, LPN1)

The gateway node 21 transmits the packet to the node 1 20a of the private network 20 corresponding to the converted private IP address and port number (LIP1, LPN1) (step S410).

The node 1 20a performs an operation according to the packet, generates a response packet, and transmits it through the Internet (step S412).

Here, the source information and the destination information are exchanged. Thus, the source information is the private IP address and port number (LIP1, LPN1), and the destination information is (DIP, PD).

The response packet is transmitted to the gateway node 21 of the private network 20. The source information (LIP1, LPN1) is converted to the public IP address of the gateway node 21 and the allocated port value (step S414).

(LIP1, LPN1)→(SIP, Px)

When the source information is varied, the response packet is transmitted to the network node 12 having the public IP address and port number of (DIP, PD) (step S416).

On the other hand, the external network node 12 of the Internet can demand to cancel an access reservation for the wanted node.

Figure 8:
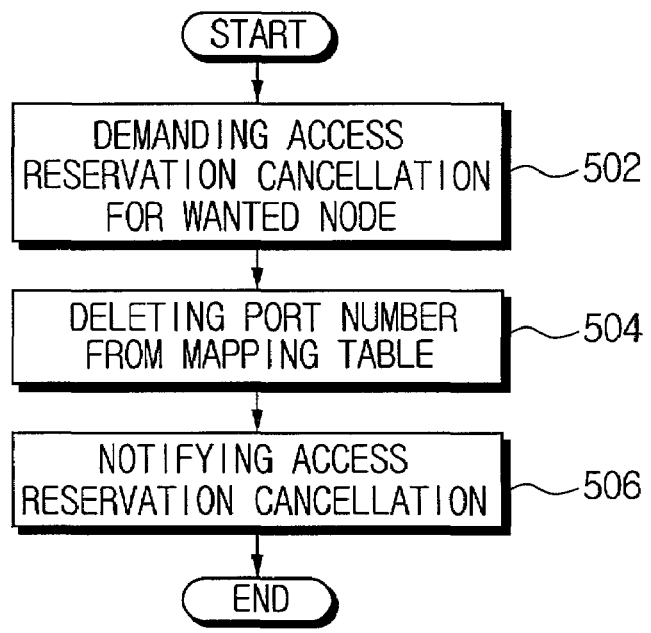
FIG. 8 is a flowchart of the process in which access reservation is cancelled.

FIG. 8 is a flowchart of the process in which an access reservation is cancelled.

The external network node 12 transmits an access reservation cancel demand packet for the reserved node to the gateway node 21 (step S502).

The gateway node 21 receiving the access reservation cancel demand packet for the reserved node deletes the port number, which is allocated to the reserved node, from the mapping table (step S504).

Thereafter, the gateway node 21 transmits the response packet to the network node 12 of the Internet in order to notify the network node 12 that the access reservation is cancelled. Accordingly, the allocated port number can be used when another node is reserved.

Although the preferred embodiment of the present invention has been described, it is understood that the present invention should not be limited to this preferred embodiment but various changes and modifications can be made by one skilled in the art within the spirit and scope of the present invention as hereinafter claimed.

In accordance with the present invention, the external network node of the Internet can access the network node of the private network having the private IP address.

Moreover, the users who have a private network such as a SOHO or home network can provide their services through the Internet.

As a result, individuals or small business owners can provide various services through the Internet.

What is claimed is:

1. A network address conversion system for enabling an access to a specific node of a private network, having a private IP address and an internal port value, comprising:
    a reservation unit which receives an access reservation demand from an external network node to access the specific node of the private network;
    an external port value allocation unit which allocates a first external port value to the specific node, which is different from the internal port value of the specific node of the private network, in response to receiving the access reservation demand from the external node, and transmitting the first external port value to the external network node;
    a mapping table which records a mapping relationship between the first external port value that is allocated and the internal port value of the specific node of the private network; and
    an address conversion unit which converts the first external port value into the private IP address of the specific node, when the external network node accesses the specific node by using the first external port value,
    wherein the first external port value that is allocated to the specific node in response to receiving the access reservation demand from the external node is a new port value and said new port value is allocated when the access reservation demand is received,
    wherein the address conversion unit receives a response packet from the external node that includes the new port value and converts the new port value to the internal port value such that the response packet is transmitted to the specific node with the internal port value.

2. The system of claim 1, wherein the reservation unit deletes the first external port value allocated to the specific node, from the mapping table, when receiving an access reservation cancel demand for the specific node, from the external network node.

3. The system of claim 1, wherein the mapping table records the mapping relationship between the first external port value that is allocated and the internal port value of the specific node of the private network when the access reservation demand is received from the external network node.

4. The system of claim 1, wherein the external network node includes a public IP address and a second external port value.

5. A network address conversion method for enabling access to a specific node of a private network, having a private IP address and an internal port value, comprising the steps of:
   receiving an access reservation demand from an external network node to access the specific node of the private network;
   allocating a first external port value to the specific node, which is different from the internal port value of the specific node of the private network, in response to receiving the access reservation demand from the external network node, storing said first external port value in a mapping table that records a mapping relationship between the first external port value that is allocated and the internal port value of the specific node of the private network, and transmitting said first external port value to the external network node; and
   converting said first external port value into the private IP address of the specific node, when the external network node accesses the specific node by using said first external port value,
   wherein the first external port value that is allocated to the specific node in response to receiving the access reservation demand from the external node is a new port value and said new port value is allocated when the access reservation demand is received,
   wherein a response packet is received from the external node that includes the new port value and the new port value is converted to the internal port value such that the response packet is transmitted to the specific node with the internal port value.

6. The method according to claim 5, further comprising the steps of:
   deleting said first external port value allocated to the specific node, from the mapping table when an access reservation cancel demand for the specific node having the allocated said first external port value, is received from the external network node.

7. The method of claim 5, wherein the storing said first external port value in a mapping table comprises recording a mapping relationship between the first external port value that is allocated and the internal port value of the private network when the access reservation demand is received from the external network node.

8. The method of claim 5, wherein the external network node includes a public IP address and a second external port value.

9. A computer readable medium For recording a network address conversion method for enabling an access to a specific node of a private network, having a private IP address, the computer readable medium encoded with a computer program for executing on a computer, said network address conversion method comprising the steps of:
   receiving an access reservation demand from an external network node to access the specific node of the private network;
   allocating an external port value to the specific node, which is different from the internal port value of the specific node of the private network, in response to receiving the access reservation demand from the external network node, storing the external port value in a mapping table that records a mapping relationship between the first external port value that is allocated and the internal port value of the specific node of the private network, and transmitting the external port value to the external network node; and
   converting the external port value into the private IP address of the specific node, when the external network node accesses the specific node by using the external port value,
   wherein the first external port value that is allocated to the specific node in response to receiving the access reservation demand from the external node is a new port value and said new port value is allocated when the access reservation demand is received,
   wherein a response packet is received from the external node that includes the new port value and the new port value is converted to the internal port value such that the response packet is transmitted to the specific node with the internal port value.

10. The computer readable medium of claim 9, wherein the storing said first external port value in a mapping table comprises recording a mapping relationship between the first external port value that is allocated and the internal port value of the private network when the access reservation demand is received from the external network node.

* * * * *